US012341206B2

(12) United States Patent
Ellis et al.

(10) Patent No.: US 12,341,206 B2
(45) Date of Patent: *Jun. 24, 2025

(54) REMOVABLE BATTERY PACK

(71) Applicant: ZEBRA TECHNOLOGIES CORPORATION, Lincolnshire, IL (US)

(72) Inventors: Andrew Ellis, Kitchener (CA); Xinghua Shi, Milton (CA); Mu-Kai Shen, Taipei (TW)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,576

(22) Filed: Nov. 20, 2023

(65) Prior Publication Data

US 2024/0088497 A1 Mar. 14, 2024

Related U.S. Application Data

(63) Continuation of application No. 17/020,174, filed on Sep. 14, 2020, now Pat. No. 11,824,215.

(51) Int. Cl.
*H01M 50/20* (2021.01)
*G06F 1/16* (2006.01)
*H01M 50/543* (2021.01)

(52) U.S. Cl.
CPC .......... *H01M 50/20* (2021.01); *G06F 1/1626* (2013.01); *H01M 50/543* (2021.01); *H01M 2220/30* (2013.01)

(58) Field of Classification Search
CPC . H01M 50/20; H01M 50/543; H01M 2220/30
See application file for complete search history.

(56) References Cited

U.S. PATENT DOCUMENTS

| 5,665,485 A | 9/1997 | Kuwayama et al. |
| 5,895,729 A | 4/1999 | Phelps, III et al. |
| 6,710,576 B1 | 3/2004 | Kaufman et al. |

(Continued)

FOREIGN PATENT DOCUMENTS

| CN | 101179607 A | 5/2008 |
| JP | H11162431 A | 6/1999 |
| JP | 2003059468 A | 2/2003 |

(Continued)

*Primary Examiner* — Jane J Rhee

(57) ABSTRACT

A battery for a mobile device includes: a battery housing including an inner wall, an opposing outer wall, a rear wall, and an opposing forward wall, the rear and forward walls each joining the inner and outer walls; an electrical contact disposed on the inner wall, configured to engage with an electrical interface within a device housing; a seal on the inner wall surrounding the electrical contact and a further portion of the inner wall, and configured to engage a complementary surface within the device housing; a hook extending from the forward wall, configured to engage the device housing to establish a pivot axis of the battery housing during battery insertion and removal; and a latch extending from the rear wall, biased towards an extended position to secure the battery within the device housing, and movable to a retracted position to release the battery from the device housing.

13 Claims, 13 Drawing Sheets

(56) References Cited

U.S. PATENT DOCUMENTS 11,824,215 B2 * 11/2023 Ellis .................... H01M 50/543
2008/0268329 A1    10/2008 Mackle et al.

FOREIGN PATENT DOCUMENTS

| JP | 2007035279 A | 2/2007 |
| JP | 2012142212 A | 7/2012 |
| WO | 2019/211063 A1 | 11/2019 |

* cited by examiner

REMOVABLE BATTERY PACK

RELATED APPLICATIONS

This utility patent arises from a continuation of U.S. application Ser. No. 17/020,174, filed Sep. 14, 2020, which is hereby incorporated herein by reference.

BACKGROUND

Mobile devices, such as mobile computers, barcode scanners, printers and the like may be equipped with removable battery packs. Ease of removability of such battery packs may conflict with ingress protection (e.g. against dust and/or water) in the mobile devices, resulting in battery removal being a time-consuming process, or resulting in straightforward battery swapping but suboptimal environmental protection.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
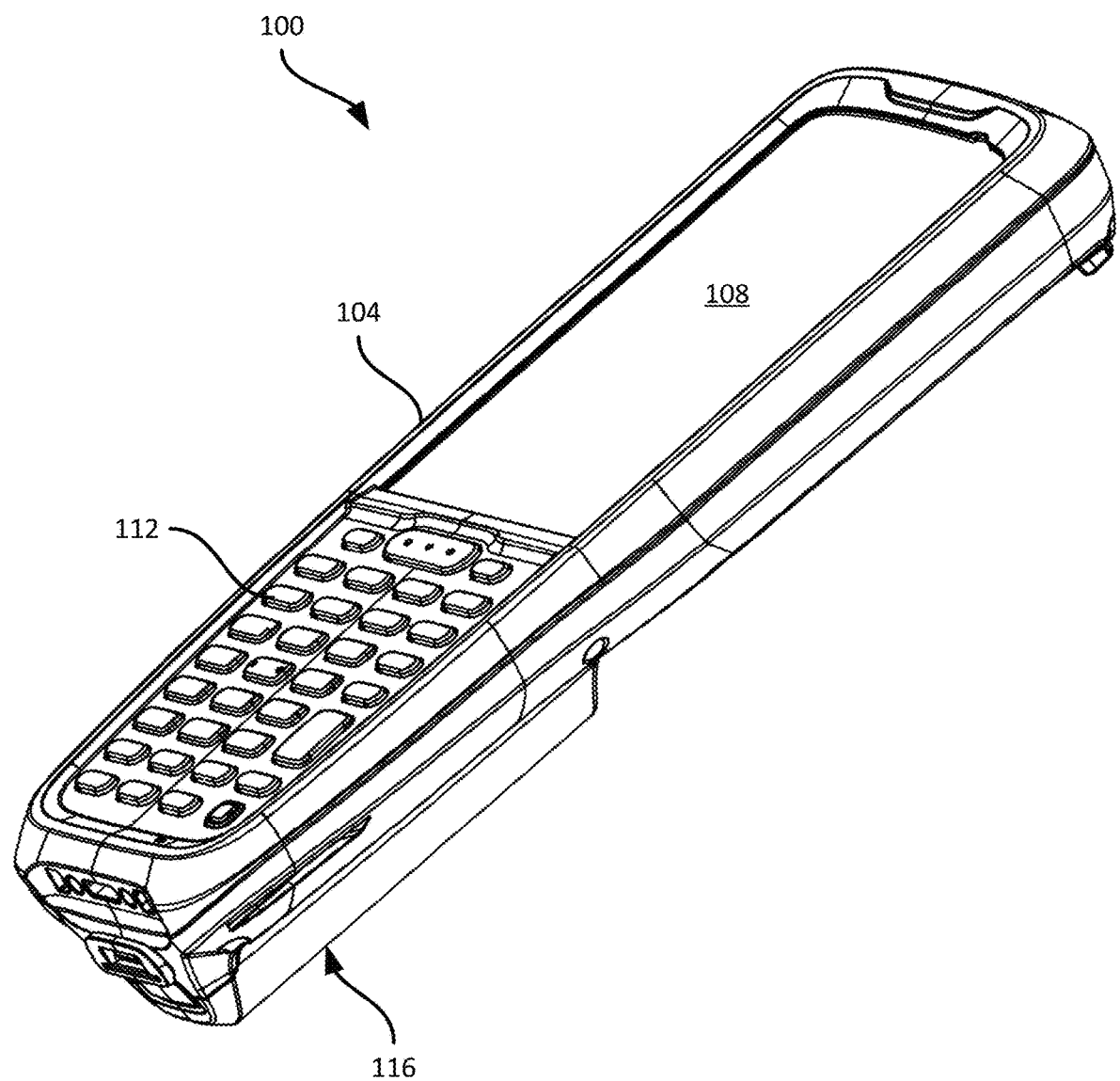
FIG. 1 is a diagram illustrating a mobile computing device from the front.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a battery for a mobile device, the battery comprising: a battery housing including an inner wall, an opposing outer wall, a rear wall, and an opposing forward wall, the rear and forward walls each joining the inner and outer walls; an electrical contact disposed on the inner wall, the electrical contact configured to engage with an electrical interface within a device housing of the mobile device; a seal on the inner wall surrounding the electrical contact and a further portion of the inner wall, and configured to engage a complementary surface within the device housing; a hook extending from the forward wall and configured to engage the device housing to establish a pivot axis of the battery housing during insertion and removal of the battery; and a latch extending from the rear wall, the latch biased towards an extended position to secure the battery within the device housing, and movable to a retracted position to release the battery from the device housing.

Additional examples disclosed herein are directed to a battery for a mobile device, the battery comprising: a battery housing including an inner wall, an opposing outer wall, a rear wall, and an opposing forward wall, the rear and forward walls each joining the inner and outer walls; an electrical contact disposed on the inner wall, the electrical contact configured to engage with an electrical interface within a device housing of the mobile device; a seal on the inner wall surrounding the electrical contact; a hook extending from the forward wall and configured to engage the device housing to establish a pivot axis of the battery housing during insertion and removal of the battery; and a latch extending from the rear wall, the latch biased towards an extended position to secure the battery within the device housing, and movable to a retracted position to release the battery from the device housing; and a hood defined by the upper wall, extending beyond the rear wall, wherein the hood includes a stop defining a limit to the extended position of the latch.

FIG. 1 depicts a mobile computing device 100, also referred to herein as the mobile device 100 or simply the device 100. The device 100 can be a handheld computer, e.g. employed in retail facilities, transport and logistics facilities, healthcare facilities, and the like. The device 100 includes a housing 104 supporting various other components of the device 100, including a display 108, a keypad 112, and the like. As will be apparent to those skilled in the art, the housing 104 also contains various internal components of the device 100, including integrated circuits such as controllers, memory devices, and the like. The housing 104 may be coupled to accessories such as a pistol grip (not shown) for holding the device 100.

The components of the device 100 requiring electrical power are supplied with such power by a battery pack 116, also referred to herein simply as the battery 116, that is removably coupled to the housing 104. As shown in FIG. 1, a portion of the battery 116 is exposed to the exterior of the device 100. In other words, when the battery 116 is installed, the battery 116 forms a portion of the externally-facing surface area of the device 100. As will be discussed in greater detail below, the battery 116 includes various structural features to facilitate removal and installation of the battery 116 while providing at least a degree of protection against ingress of environmental factors such as water and dust, which can negatively affect the internal electrical components of the device 100.

Figure 2:
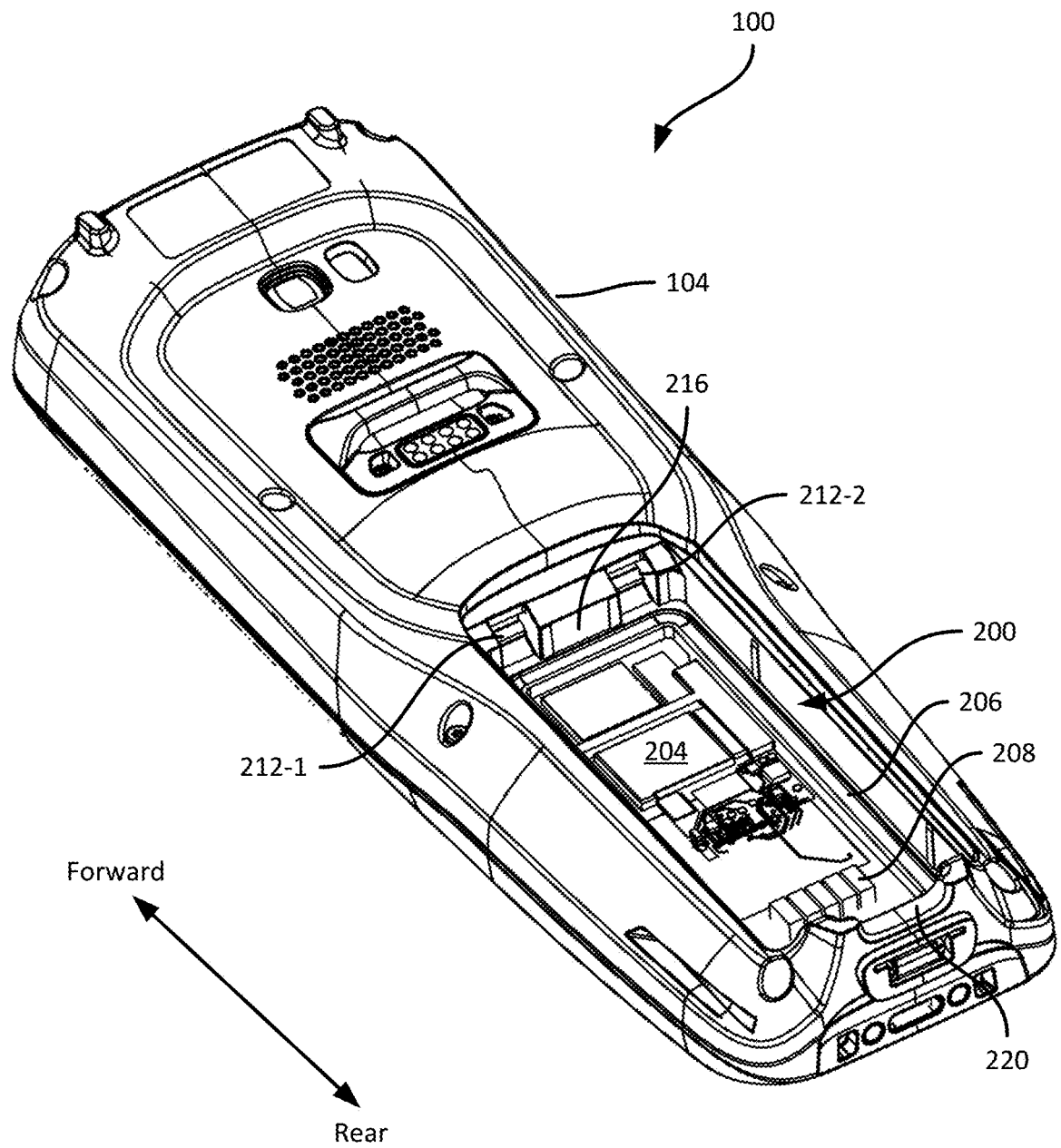
FIG. 2 is a diagram illustrating the mobile computing device of FIG. 1 from the rear, with a battery thereof removed.

Turning to FIG. 2, the device 100 is shown from a rear side, opposite the side illustrated in FIG. 1. In addition, the device 100 is illustrated in FIG. 2 with the battery 116 removed, to expose a battery compartment 200. The compartment 200 is a cavity defined in the housing 104, into which a portion of the battery 116 is received. As seen in FIG. 2, various internal components of the device 100 are exposed to the compartment 200, such as integrated circuits 204, and an electrical interface 208 for connecting the battery 116 with the electrically-powered components of the device 100. The interface 208 and the circuits 204 are surrounded by a seal surface 206, extending around a perimeter of the compartment 200. The battery 116 not only supplies power to the device 100, but also interacts with the seal surface 206 to enclose the interface 208 and the circuits 204, protecting such components against water and/or dust ingress.

The compartment 200 includes certain structural features that enable the battery 116 to be coupled to the device 100, as well as removed from the device 100, while mitigating against accidental removal of the battery 116 from the device 100. In particular, the compartment 200 includes recesses 212-1 and 212-2 extending into a forward surface 216 of the compartment 200. The forward surface 216 is referred to as "forward" for illustrative purposes only, according to the forward/rear axis also shown in FIG. 2. A rearward portion of the walls defining the compartment 200 includes a cutout 220 to accommodate a portion of the battery 116.

The battery 116 itself, as will be discussed below, includes various features to interact with the seal surface 206, the recesses 212 and the cutout 220 to removably couple the battery 116 to the device 100 while providing a degree of ingress protection to the interface 208 and the circuits 204.

Figure 3:
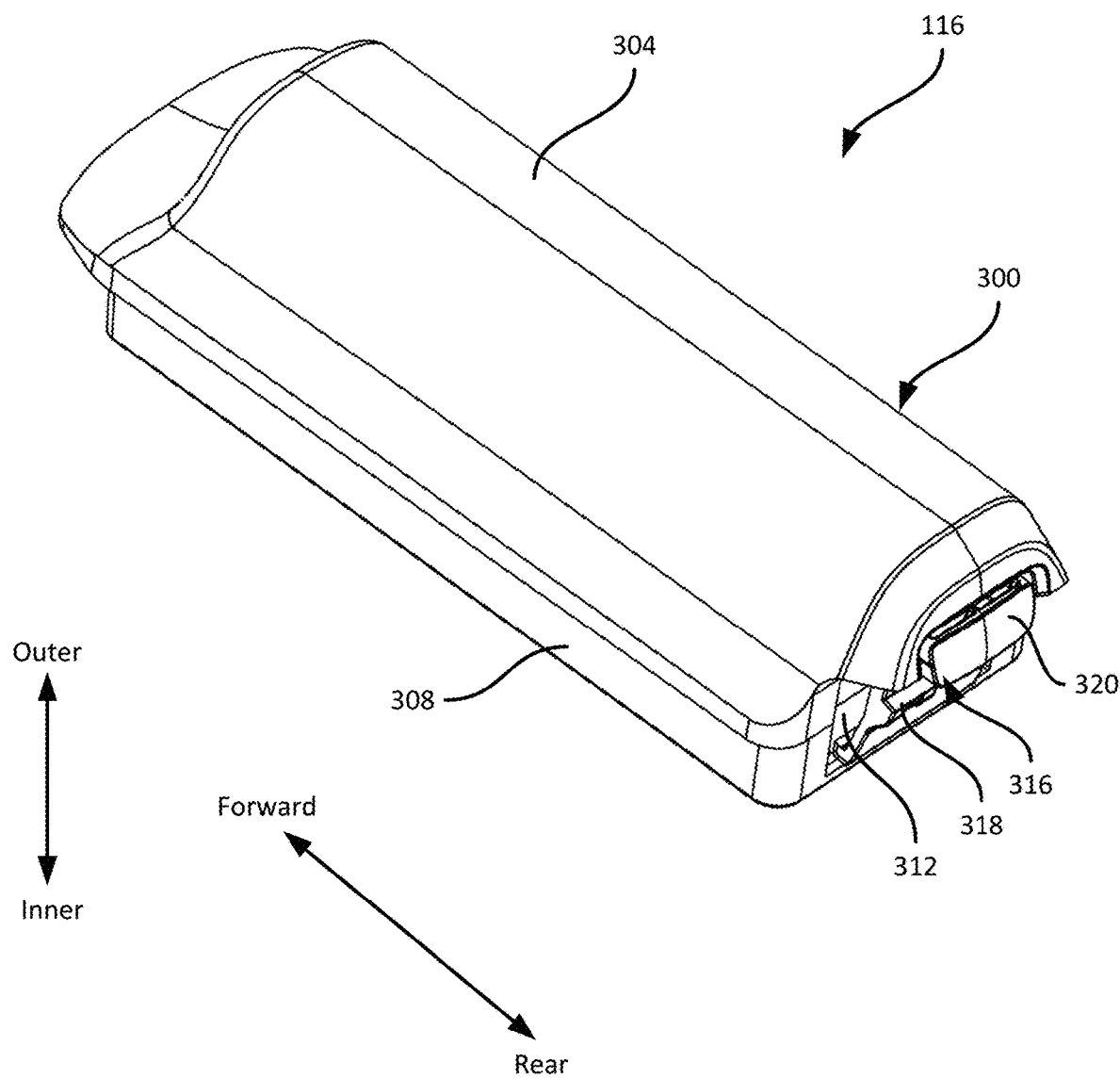
FIG. 3 is a diagram of the battery of the mobile computing device of FIGS. 1 and 2, from the top.

Turning to FIG. 3, the battery 116 is shown in isolation, in substantially the same orientation as the battery 116 would be installed in the device 100 as illustrated in FIG. 2. The battery 116 includes a battery housing 300 including a plurality of walls that enclose one or more battery cells (not visible in FIG. 3). In particular the battery housing 300 includes an outer wall 304, referred to as outer because when the battery 116 is installed, the outer wall 304 faces away from the interior of the device 100 (i.e. outwards). As will be apparent, the outer wall 304 forms a portion of the external surface of the device 100 when the battery 116 is installed.

The battery housing 300 also includes opposing sidewalls 308 (one of which is visible in FIG. 3) that join the upper wall 304 to an opposing lower wall. In addition, the battery housing 300 includes a rear wall 312, and an opposing forward wall. The battery 116 further includes a latch 316 extending from the rear wall 312. The latch 316 is movable between an extended position, in which the latch 316 retains the battery 116 within the compartment 200, and a retracted position, in which the battery 116 is released from the compartment 200 for removal from the device 100. The latch 316 can be coupled to the rear wall 312, for example, via a living hinge. The latch 316 includes at least one locking surface 318 extending rearward therefrom, for engaging with a lip or ledge within the compartment 200 to retain the battery 116 within the compartment 200.

The latch 316 is biased towards the extended position (rearward), and may be moved to the retracted position by application of pressure in the forward direction to a contact surface 320 of the latch 316 (e.g. a button integrally formed with the latch 316).

Figure 4:
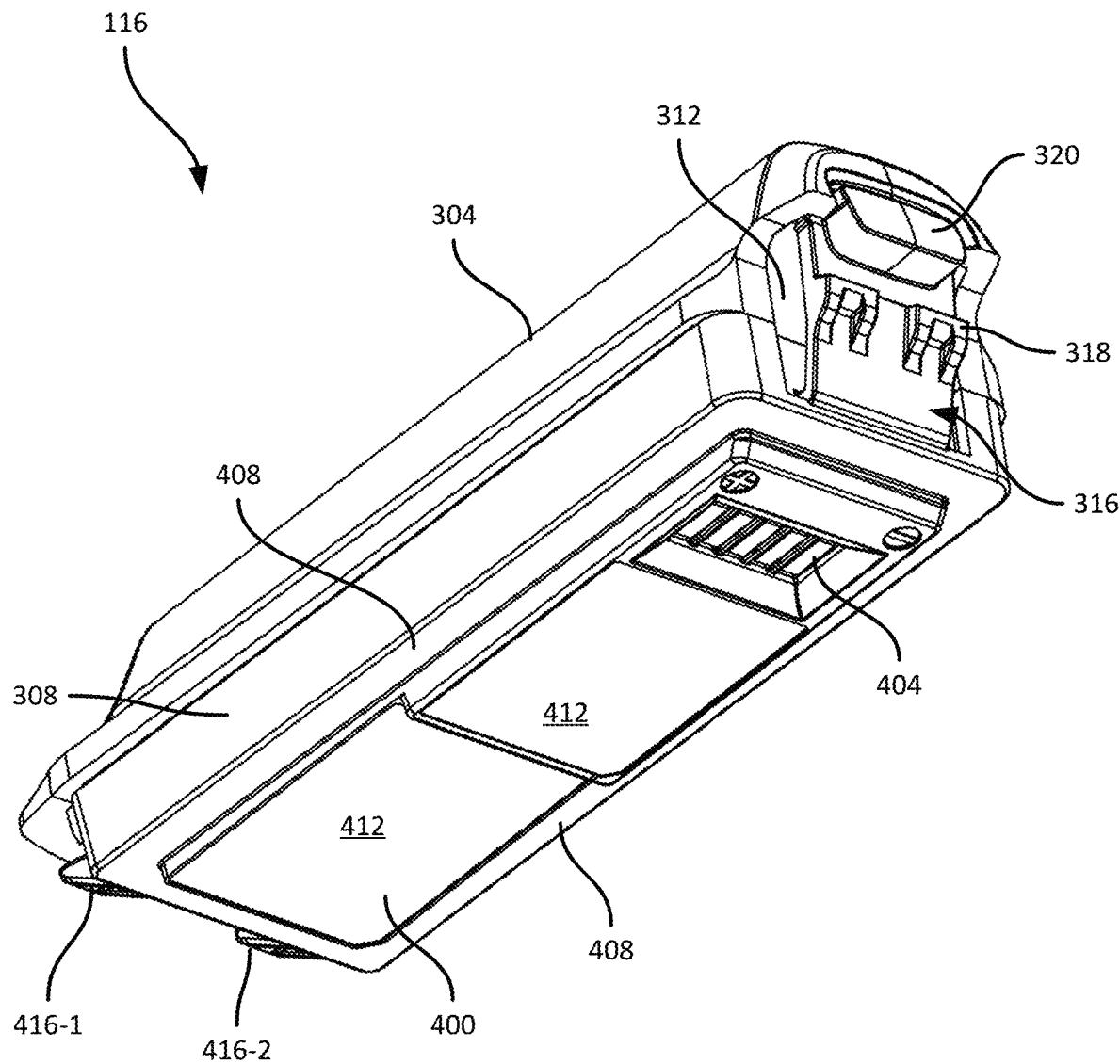
FIG. 4 is a diagram of the battery of FIG. 3, from below.

Turning to FIG. 4, the battery 116 is illustrated from below, revealing an inner wall 400 as mentioned above, and illustrating the latch 316 in greater detail. In particular, the latch 316 extends from the rear wall 312 adjacent the inner wall 400 (e.g. close to or at the intersection of the lower wall 400 with the rear wall 312). The latch 316 extends rearward and outward, and includes, in the illustrated example, a pair of locking surfaces 318 extending rearward therefrom (e.g. at either side of the latch 316).

The inner wall 400 includes a set of electrical contacts 404 configured to engage with the interface 208 to deliver power from the battery 116 to the device 100. In addition, the inner wall 400 includes a seal 408 that surrounds not only the contacts 404, but also a further portion of the inner wall 400. In the present example, the seal 408 forms a perimeter extending around the edge of the inner wall 400 (i.e. adjacent to the rear wall 312, the sidewalls 308 and the forward wall of the battery housing 300). The seal 408 thus surrounds the contacts 404 and a further portion 412 of the inner wall 400. As will now be apparent, the further portion 412 of the inner wall 400 lies adjacent to the circuits 204 shown in FIG. 2. Therefore, when the battery 116 is installed, the seal 408 surrounds both the contacts 404 and the interface 208, as well as the circuits 204. The seal 408 can be formed from a compressible material, such as rubber, silicone, or the like.

The battery 116 also includes at least one hook 416 (in the present example, the battery 116 includes two hooks 416-1 and 416-2) extending from the forward wall thereof, to engage with the recesses 212, as will be illustrated in further detail below.

Figure 5:
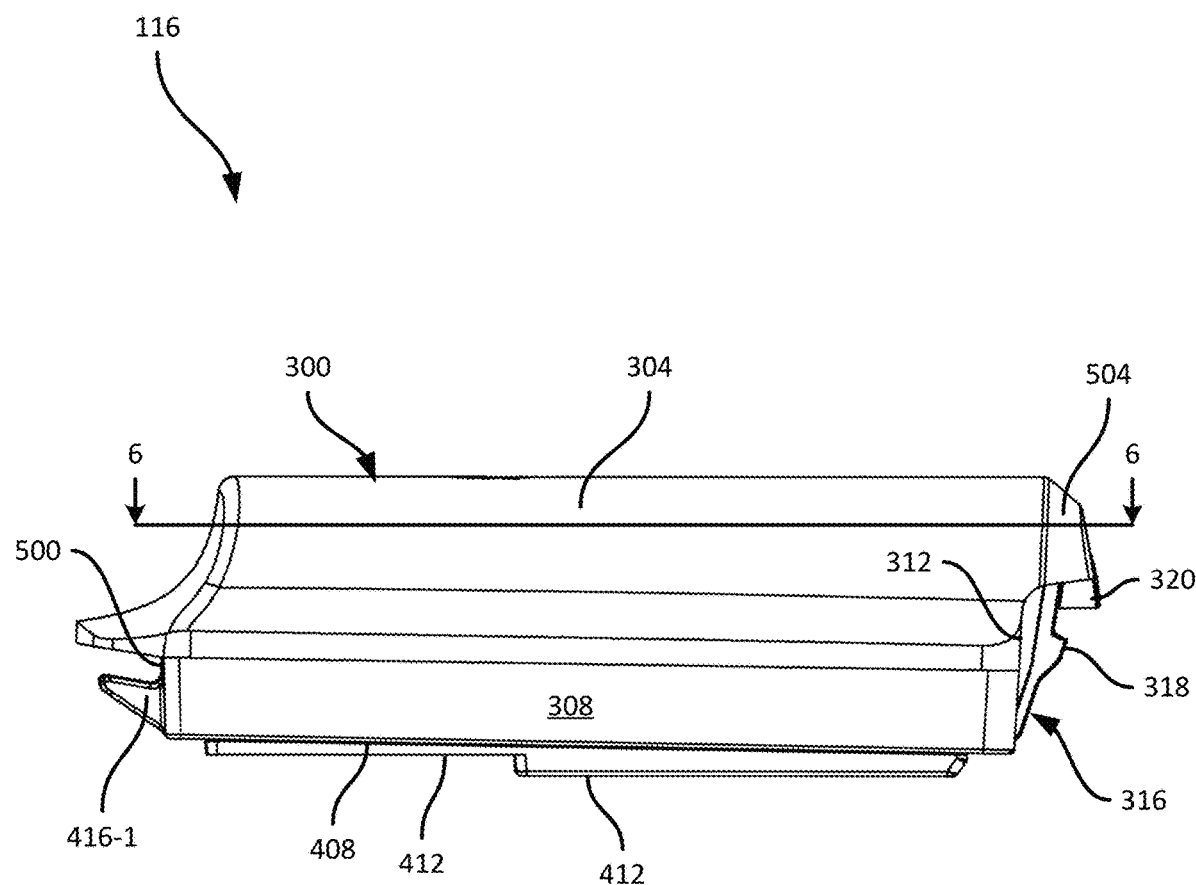
FIG. 5 is a side view of the battery of FIG. 3.

FIG. 5 illustrates a side view of the battery 116, in which the profile of the hook 416-1 is visible along with the forward wall 500 of the battery housing 300. The hooks 416 extend forward from the forward wall 500, and are configured to extend into the recesses 212 of the compartment. When the hooks 416 engage the recesses 212, the hooks 416 establish a pivot axis of the battery 116 relative to the device 100. That is, to install the battery 116, the hooks 416 are first inserted into the recesses 212, and the battery 116 is then pivoted about the hooks 416 into the compartment 200.

The outer wall 304 of the battery housing 300 includes, as seen in FIG. 5 (and also visible in FIGS. 3 and 4) a hood 504 that extends rearward relative to the rear wall 312. In particular, the hood 504 extends over the contact surface 320, covering the button that provides the contact surface 320. The hood 504 thus performs several functions. For example, the hood 504 protects the contact surface 320 from accidental contact, e.g. when the device 100 is dropped. Accidental impact to the rear of the device 100 may strike the hood 504 rather than the contact surface 320, preventing accidental ejection of the battery 116. In other instance, such accidental impact may affect the contact surface 320, but may not result in sufficient movement of the contact surface 320 (and therefore the latch 316, with which the contact surface 320 is integrally formed) before the hood 504 is impacted, to allow for accidental battery ejection.

The hood 504 also serves as a grip to remove the battery 116 from the device 100. In particular, to remove the battery 116, the contact surface is pressed in a forward direction, which transitions the latch 316 toward the rear wall 312, from the extended position to a retracted position. The act of pushing the contact surface 320 in a forward direction, e.g. by one of more digits of the operator of the device 100, results in the contact surface receding underneath the hood 504. The digits of the operator may then grip the underside (i.e. the inner side) of the hood 504 and pull the hood 504 outwards to lift the battery 116 out of the compartment.

Figure 6:
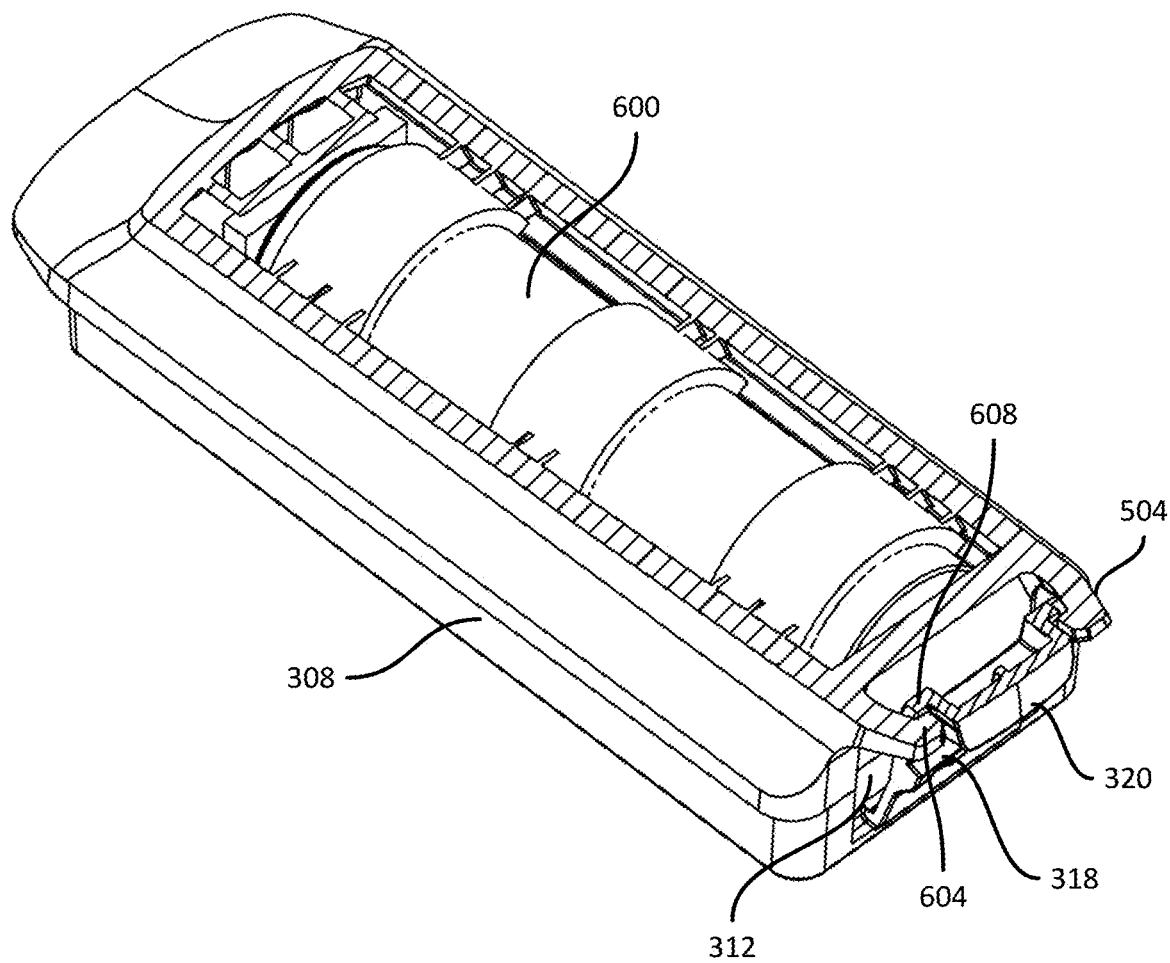
FIG. 6 is a sectional view of the battery of FIG. 3.

FIG. 6 illustrates the battery 116 with a cross section taken at the line 6-6 shown in FIG. 5, revealing the cell 600 of the battery 116 within the battery housing 300. In addition, as shown in FIG. 6 the hood 504 includes at least one stop to limit the range of motion of the latch 316. Specifically, the hood 504 includes a pair of stops 604, and the latch 316 includes a corresponding pair of tabs 608. If the latch 316 is extended in a rearward direction beyond the extended position shown (e.g. if the contact surface 320 catches on an external object), the tabs 608 impact the stops 604, preventing further extension and possible breakage of the latch 316. As will also be apparent, the rear wall 312 itself establishes a limit to forward motion of the latch 316, in that the latch 316 impacts the rear wall 312 and is thereby prevented from further forward movement.

Figure 7:
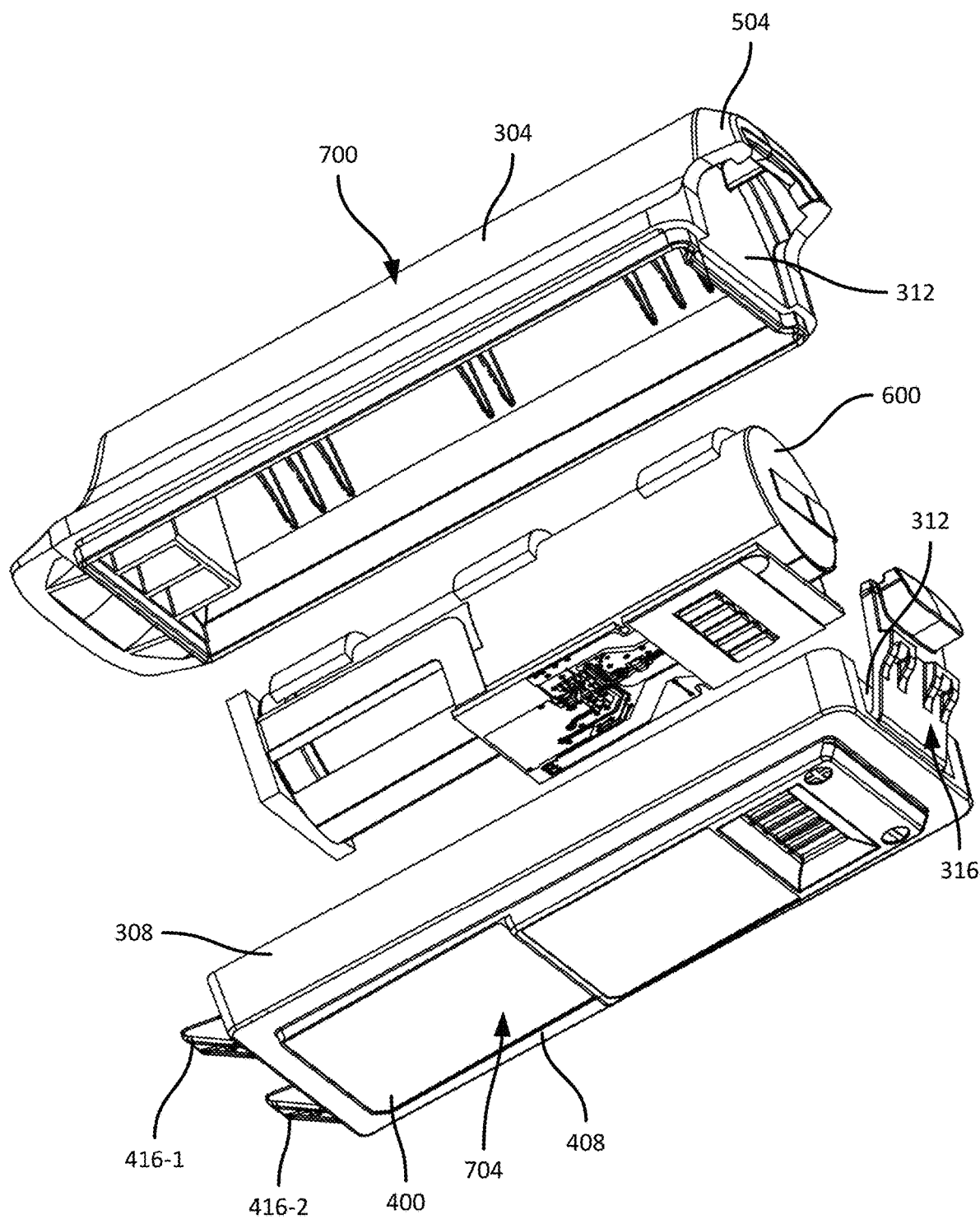
FIG. 7 is an exploded view of the battery of FIG. 3.

Turning to FIG. 7, the battery 116 is shown in an exploded view. As shown in FIG. 7, in the present example the battery housing 300 is implemented as an outer housing portion 700 and an inner housing portion 704. The outer housing portion 700 defines the outer wall 304, an outer portion of the rear wall 312, and may also define outer portions of the forward wall 500 and the sidewalls 308. The inner housing portion 704, meanwhile, defines the inner wall 400, and may define inner portions of the rear wall 312, the forward wall 500, and the sidewalls 308.

As illustrated, the hooks 416 and the latch 316 are both connected to the inner housing portion 704 in this example. As will be apparent, to compress the seal 408 against the seal surface 206 within the compartment 200, the hooks 406 and the latch 316 exert downward (i.e. inward) pressure on the battery housing 300. The housing portions 700 and 704 may be joined, for example, by an ultrasonic weld, an adhesive, or the like. To reduce stress on the weld and/or adhesive, placing the hooks 416 and latch 316 on the same housing portion (the housing portion 704 in this example) imposes such pressure on a single housing portion.

Figure 8:
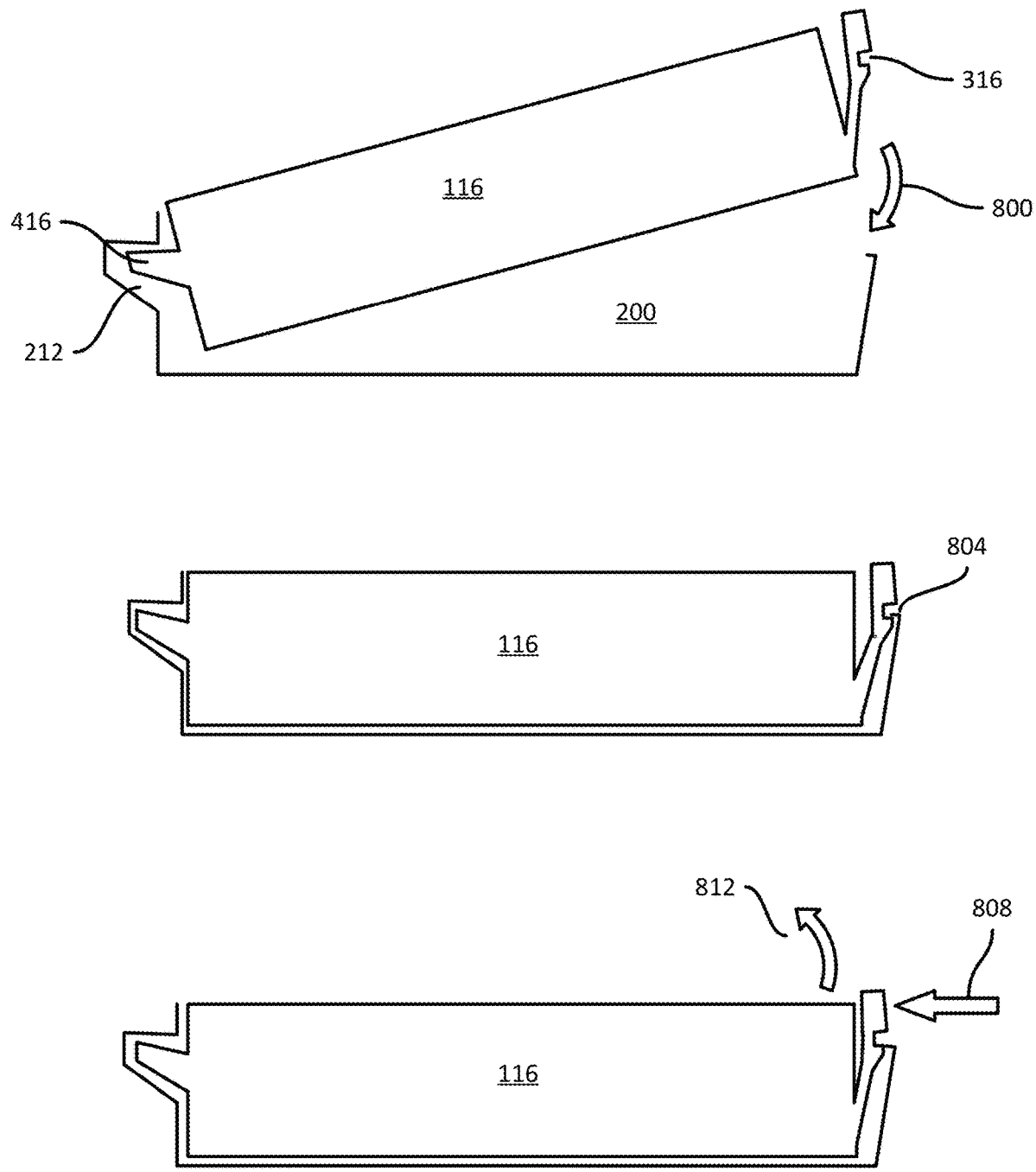
FIG. 8 is a diagram illustrating installation and removal of the battery of FIG. 3 in the mobile computing device of FIG. 1
Figure 9:
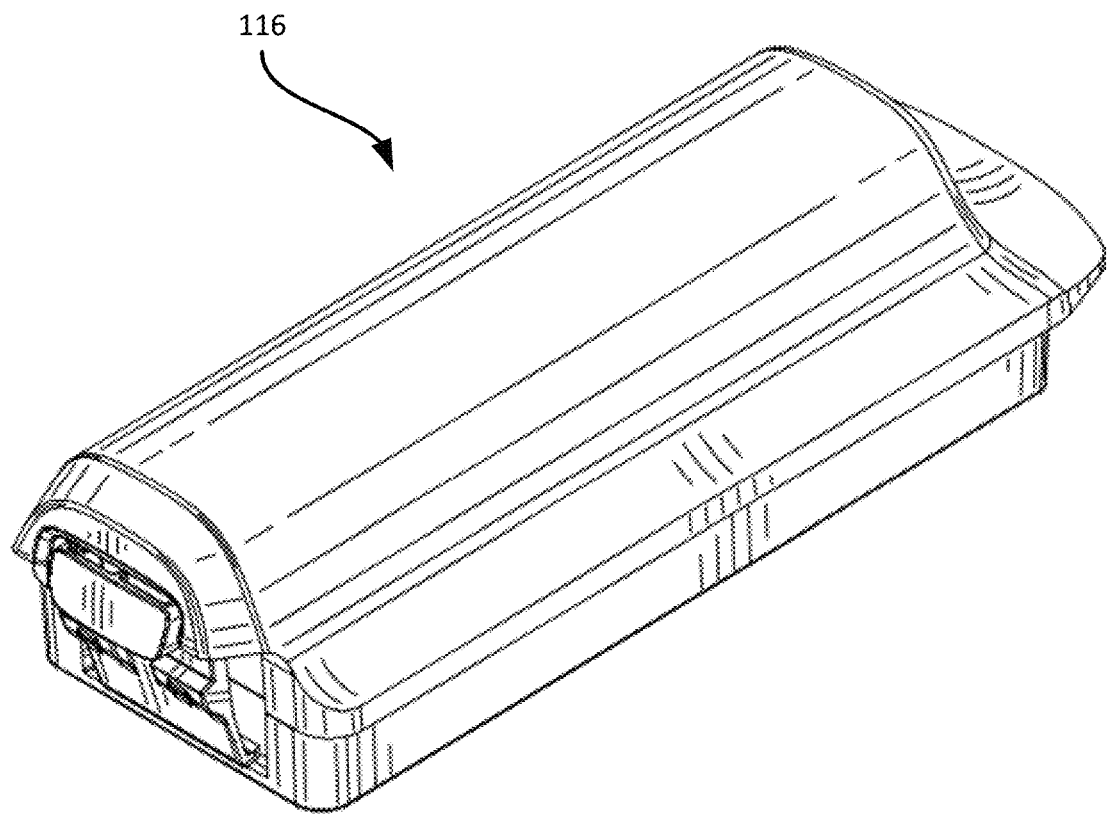
FIG. 9 is a first perspective view of an example battery.
Figure 10:
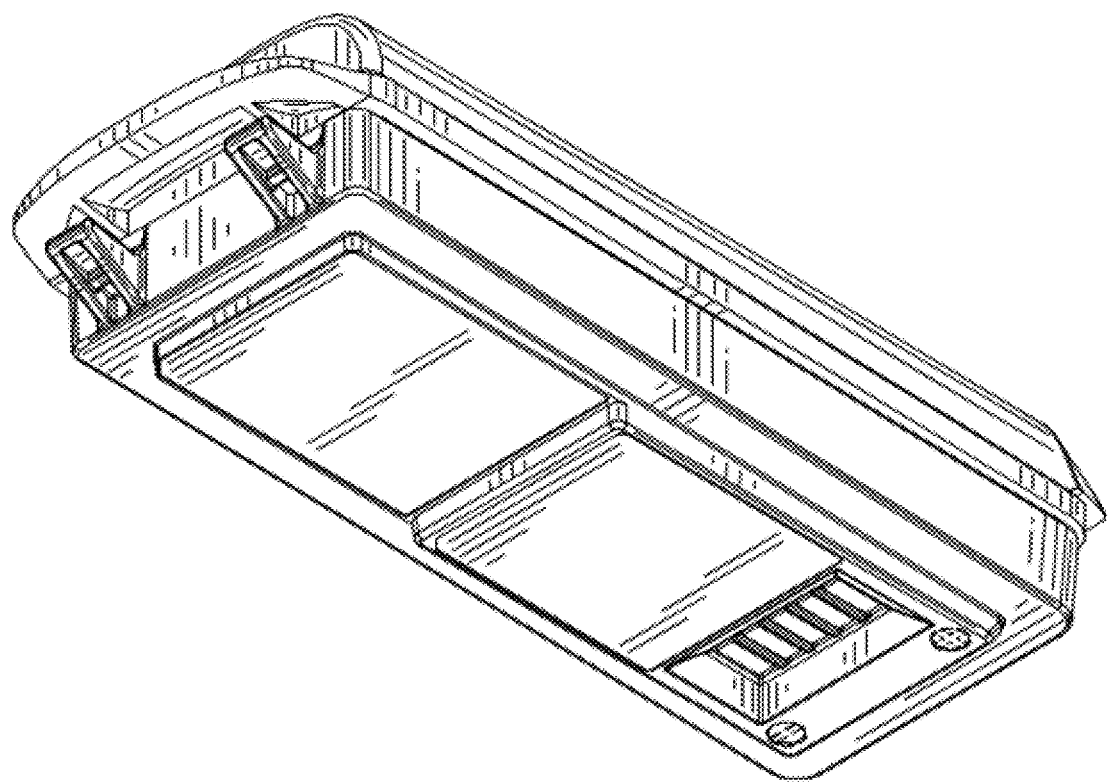
FIG. 10 is a second perspective view of the battery of FIG. 9.
Figure 11:
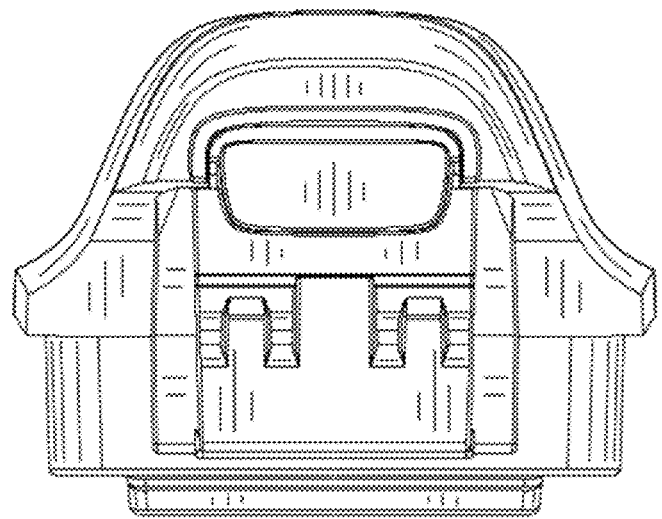
FIG. 11 is a bottom view and a top view of the battery of FIG. 9.
Figure 11:
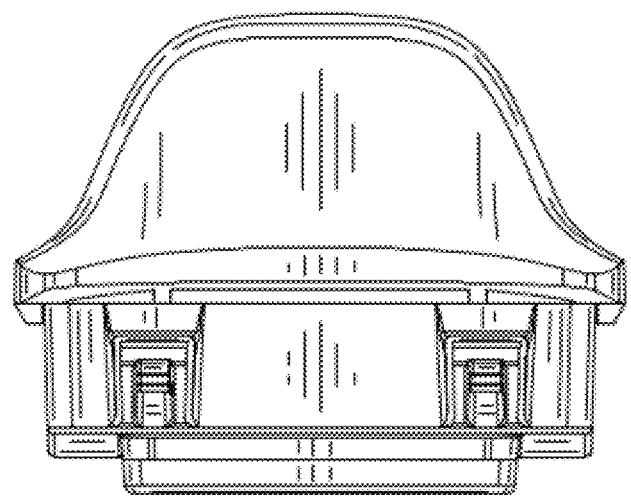
Figure 12:
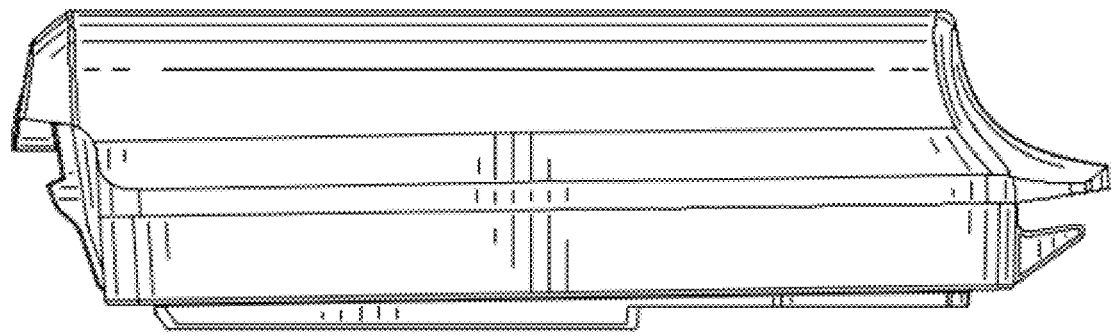
FIG. 12 is a first side and a second side view of the battery of FIG. 9.
Figure 12:
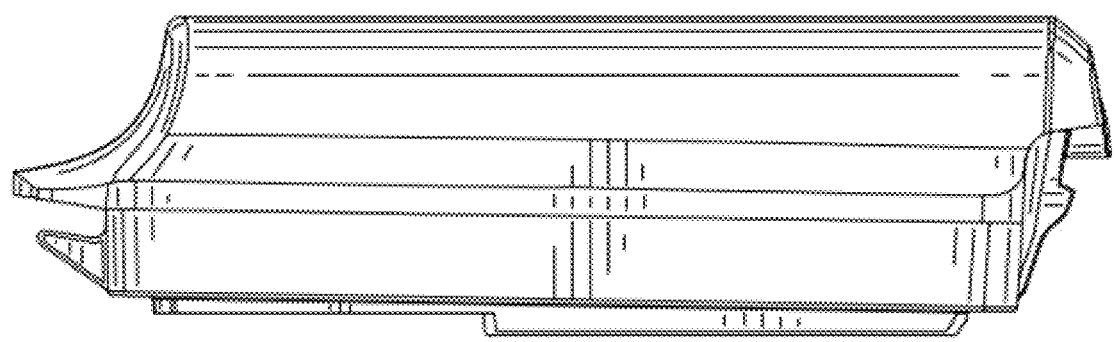
Figure 13:
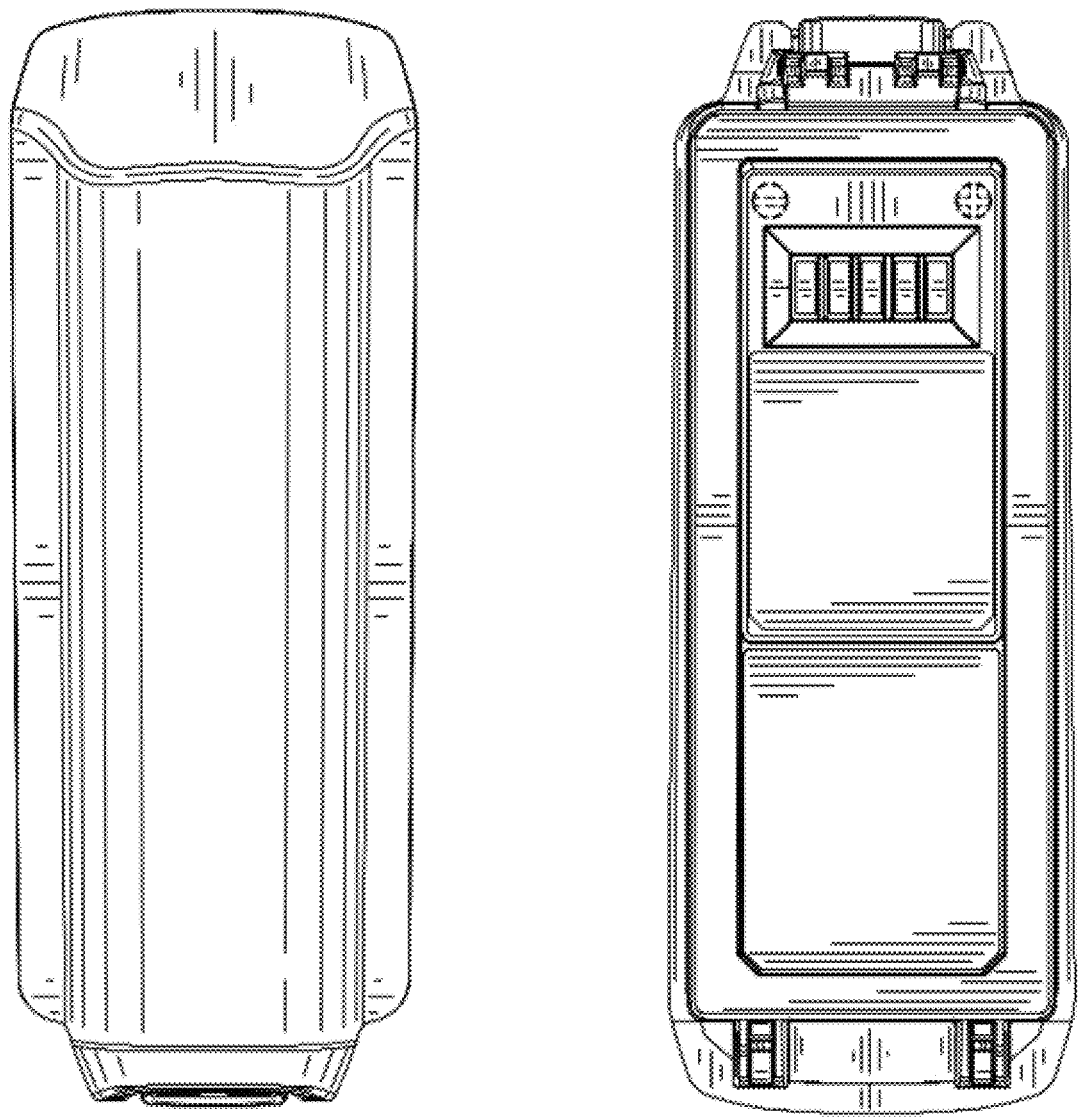
FIG. 13 is a front view and a rear view of the battery of FIG. 9.

Turning to FIG. 8, simplified illustrations of the battery 116 and the compartment 200 are shown to illustrate installation and removal of the battery 116. To install the battery 116, the hooks 416 are placed into the recesses 212. The rear end of the battery 116 is then rotated into the compartment 200 in the direction 800 (i.e. rotated about the hooks 416). The latch 316 impacts the rear wall of the compartment 200, and in doing so is compressed toward the rear wall 312. The latch 316 thus moves to a retracted position and engages with the rear wall of the compartment 200 (e.g. with a ledge 804).

To remove the battery 116, the latch 316 is depressed in a forward direction 808 until the locking surfaces 318 clear the ledge 804. The battery 116 is then rotated outwards in the direction 812, e.g. by grasping the hood 504 as discussed earlier.

FIGS. 9, 10, 11, 12, and 13 illustrate various views of a battery 116 according to an example implementation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A battery comprising:
a battery housing including an inner wall, an opposing outer wall, a rear wall, and an opposing forward wall, the rear and forward walls each joining the inner and outer walls;
an electrical contact disposed on the inner wall, the electrical contact configured to engage with an electrical interface within a device housing;
a hook extending from the forward wall and configured to engage the device housing to establish a pivot axis of the battery housing during insertion and removal of the battery; and
a latch extending from the rear wall, the latch movable to a retracted position to release the battery from the device housing;
wherein the latch having a locking surface, a hinge, and a contact surface configured to receive pressure to release the battery, wherein the locking surface is positioned on the latch between the contact surface and the hinge.

2. The battery of claim 1, wherein a seal defines a perimeter of the inner wall, extending around an edge of the inner wall adjacent to the rear wall and the forward wall.

3. The battery of claim 2, wherein a further portion of the inner wall is configured to lie adjacent to an additional device component, such that the seal protects the electrical contact, the electrical interface, and the additional device component from environmental ingress.

4. The battery of claim 1, wherein the outer wall defines a hood extending beyond the rear wall; and
wherein the hood includes a stop defining a limit to an extended position of the latch.

5. The battery of claim 4, wherein the latch includes a tab extending between the rear wall and the stop.

6. The battery of claim 4, wherein the hood extends to a forward surface of the latch when the latch is in the extended position.

7. The battery of claim 4, wherein the rear wall defines a limit to the retracted position of the latch.

8. The battery of claim 1, wherein the latch includes a contact surface to receive pressure for moving the latch to the retracted position; and
wherein the contact surface is configured to extend through a cutout in a rear portion of the device housing when the battery is installed.

9. The battery of claim 8, wherein the latch includes a button defining the contact surface.

10. The battery of claim 1, wherein the latch includes a plurality of locking surfaces configured to engage with a ledge within the device housing.

11. The battery of claim 1, wherein the battery housing includes:
(i) an inner housing defining the inner wall, and inner portions of the rear wall and the forward wall, and
(ii) an outer housing joined to the inner portion, defining the outer wall and outer portions of the rear wall and the forward wall.

12. The battery of claim 11, wherein the inner housing and outer housing are joined by a weld.

13. The battery of claim 11, wherein the latch and the hook are integrally formed with the inner housing.

* * * * *